April 21, 1959     H. J. SANDS     2,883,222
BEDFRAME CLAMP
Filed March 22, 1956

INVENTOR.
HILLARD J. SANDS
BY Oldham & Oldham
ATTYS.

United States Patent Office
2,883,222
Patented Apr. 21, 1959

2,883,222

BEDFRAME CLAMP

Hillard Jay Sands, Cleveland, Ohio, assignor to Harvard Manufacturing Company, Cleveland, Ohio, a corporation of Ohio Application March 22, 1956, Serial No. 573,244

4 Claims. (Cl. 287—103)

This invention relates to clamps, especially to clamps particularly suited for use with bedframes and pairs of telescoped angles.

Heretofore there have been quite a few bedframes of the Hollywood style made and sold and wide commercial acceptance of these frames is found today. In making the bedframes, obviously one does not known what size mattress or spring unit will be used with the bedframe as such items vary greatly, particularly in width. Hence, it is very desirable to make the bedframes of adjustable width. Inasmuch as the bedframes usually are made from metal angle irons, the adjustable width is obtained by telescoping two metal angle cross rails with relation to each other and then clamping or securing them in a fixed position at desired relative positions. Obviously it is desirable that these clamps be attractive in appearance, and be easy to apply and effective in operation. Many different styles of clamps have been tried heretofore, but it is very difficult to secure the clamps effectively in a position for rigidly and permanently securing the telescoped angles in an adjusted, desired position.

The general object of the present invention is to provide a new and improved type of a clamp for securing a pair of angles together, which clamp is characterized by the novel direction of application of clamping force therein.

Another object of the invention is to provide a small, compact type of a clamp made from a minimum number of parts wherein a small set screw can apply relatively large pressures onto a pair of telescoped metal angles.

A further object of the invention is to provide a novel clamp of the type indicated and wherein a securing or anchoring nut is secured to one portion of the clamp strap adjacent one end thereof.

Another object of the invention is to provide an attractive type of a clamp having great resistance to tearing or distortion of the clamp, and to provide a clamp having maximum strength in a strap member of the clamp.

Yet another object of the invention is to make a clamp for metal angles wherein the clamp is made from a metal strap adapted to be wrapped around a pair of angles, wherein the strap has a nut secured thereto on the inner of a pair of overlapped ends of the strap and with a clamping or set screw passing through an aperture in the top clamp surface, engaging the nut in the inner clamp strap, and bearing against the outer metal angle to force the angles together and the clamp strap outwardly with relation to the angles and effect a tight clamping or bonding engagement therewith.

The foregoing and other objects and advantages of the invention will be made more apparent as the specification proceeds.

Reference now is directed to the accompanying drawings which disclose one currently preferred type of clamp of the invention showing it assembled in an operative bedframe;

Figure 1:
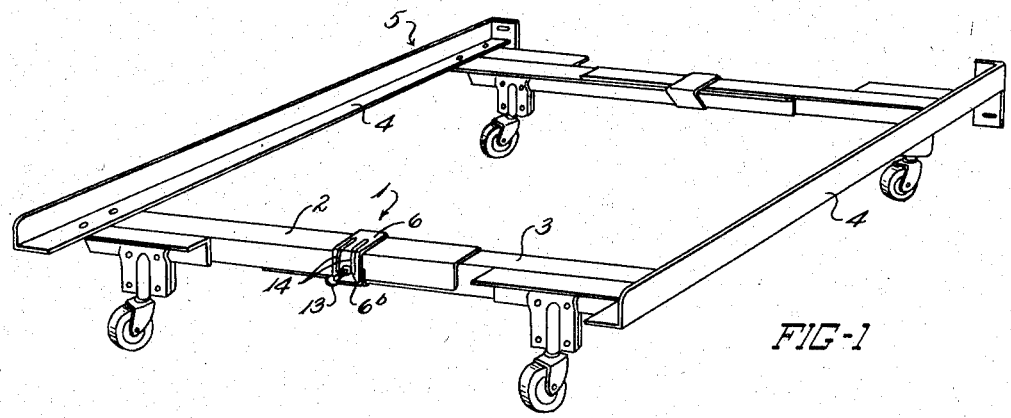
Fig. 1 is a perspective of a bedframe using clamps of the invention.
Figure 2:
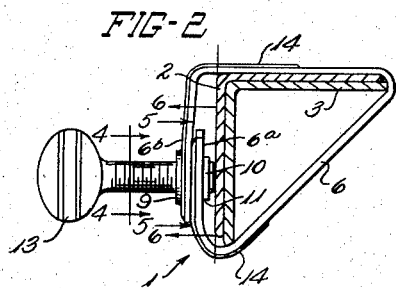
Fig. 2 is an enlarged section taken through a pair of telescoped angles of a cross rail of the bedframe in Fig. 1.
Figure 3:
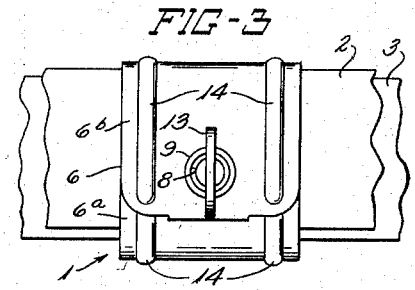
Fig. 3 is a left side elevation of the clamp assembly of Fig. 2.
Figure 4:
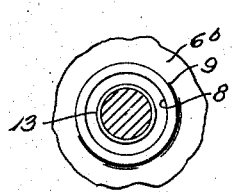
Figure 5:
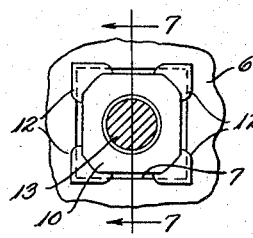
Figure 6:
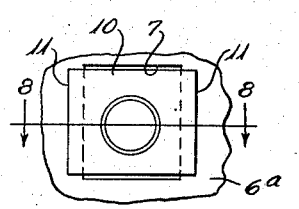
Figure 7:
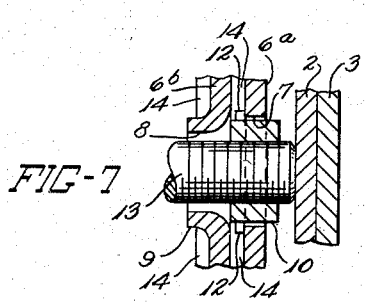
Figure 8:
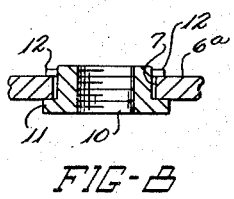

Figs. 4, 5 and 6 are fragmentary enlarged vertical sections taken on lines 4—4, 5—5 and 6—6, respectively of Fig. 2;

Fig. 7 is a detail section on line 7—7 of Fig. 5 through the clamp means of the invention; and Fig. 8 is a detail section on line 8—8 of Fig. 6.

When referring to corresponding parts as shown in the drawings and referred to in the specification, corresponding numerals are used to facilitate comparison therebetween.

Generally speaking, the present invention relates to a clamp particularly adapted for use in securing a pair of telescoped angles in desired relationship to each other. The clamp comprises a metal strap forming a triangularly shaped loop, having overlapped inner and outer ends wherein both strap ends have apertures therein. A nut is positioned on the inner end of the strap and suitably secured thereto, and a thumbscrew extends through the aperture in the outer strap end and engages the nut to be forced therethrough and against any members received within the loop formed by the strap. The outer strap end has a flange around the aperture therein for reenforcing the strap where it engages the thumbscrew.

Attention now is particularly directed to the details of this structure shown in the drawings, and a clamp of the invention is indicated as a whole by the numeral 1. This clamp 1 is shown secured to telescoped metal angle cross rail sections 2 and 3, which are individually and conventionally secured to side rails 4 of a bedframe, indicated as a whole by the numeral 5. Two sets of cross rail sections 2 and 3 are suitably secured to and extend from the side rails 4 so that the overall width of the bedframe 5 can be adjusted as desired by the ultimate customer or user of the bedframe to receive any type of box springs or other means supported thereby.

It is an important feature of the invention that the clamps 1 can be very tightly secured in place by the user of the bedframe 5, but with the clamps 1 being readily releasable from engagement with the cross rails 2 and 3, to permit adjustment of the lateral width of the bedframe.

The clamp 1 primarily comprises a relatively wide metal strap 6 which is normally formed to the shape of a closed loop and preferably a right angle triangularly shaped closed loop, as shown in Fig. 2 of the drawings. The strap 6 has inner and outer overlapped end portions 6a and 6b, respectively, and apertures 7 and 8 are provided in the inner and outer ends of the strap, respectively, for purposes to be described hereinafter in more detail. Normally the aperture 8 is of circular shape and an annular flange 9 is provided integral with the strap 6 and outlines such aperture for reenforcing and strengthening purposes. A nut 10 is provided and it normally is shaped complementary to the contour of and is received in the aperture 7. Preferably this nut 10 is provided with a pair of opposed oppositely extending flanges 11 on the axially inner edge thereof for engaging the inner surface of the strap 6, as best shown in Figs. 6 and 8 of the drawings. The opposite edge surface of the nut 10 is crimped over at the corners thereof as at 12, Fig. 5, for engaging the opposite face or surface of the strap 6 whereby the nut 10 is firmly secured to the strap 6 and carried thereby. The nut is particularly resistant to being drawn out through the aperture 7 by forces tending to push or move the nut away from the closed loop provided by the strap 6.

As another feature of the invention, a thumbscrew 13 of any conventional construction extends through the aperture 8 and engages the nut 10. This thumbscrew 13 can extend through the nut 10 for bearing against the cross rail section 2, as shown in Fig. 2 of the drawings. Thus the thumbscrew 13 will both force the outer angle 2 tightly against the inner angle 3, but also will serve to draw the strap 6 tightly against at least some of the edges of the cross rail sections 2 and 3. This latter action is secured by drawing the loop formed by the strap 6 into a more compact or tighter engagement with the angles so that they will be tightly and snugly maintained in a given position with relation to each other.

Fig. 2 of the drawings best indicates that the strap 6 forms the right angle triangularly shaped loop wherein horizontal and vertical legs are provided on such loop. Usually the hypotenuse of the loop would extend across between the legs of the metal angles forming the cross rail sections. As another feature of the invention, the vertically extending leg in the metal strap loop has the overlapped strap ends located therein. These strap ends are reenforced by the provision of sets of parallel embossed ribs 14 on the strap 6. These ribs 14 extend around the corners of the vertically extending legs of the metal loop to reenforce and strengthen the vertical legs of the loop and the corner portions thereof. The ribs prevent any stretching or tearing of the metal at these portions of the loop, which portions normally have maximum stress forces applied thereto.

The nut 10 could be welded or brazed to the inner strap end 6a, as desired but the illustrated positioning of the nut in the aperture 7 provides an inexpensive, but secure assembly of the nut in the clamp 1.

In view of the foregoing, it will be seen that a novel and improved type of a clamp has been provided. By providing the rib or flange 9 on the outer portion of the metal strap, it prevents the strap from easily tearing or marring the threads provided on the thumbscrew when the outer end of the strap loop is tightly engaged with the shank of such thumbscrew. The novel clamp 1 has an attractive appearance and is readily tightened into engagement with the metal angles or readily released therefrom, as desired by the ordinary home owner with a minimum of trouble and inconvenience. The strap is of sturdy construction, but it is relatively inexpensive to make and it is made from substantially standard components. Thus the objects of the invention are thought to be achieved.

While one complete embodiment of the invention has been disclosed herein, it will be appreciated that modification of this particular embodiment of the invention may be resorted to without departing from the scope of the invention as defined in the appended claims.

What is claimed is:

1. In a clamp, a strap having radially overlapped ends, a nut having flat peripheral edge portions carried by an inner end of said strap and positioned in but protruding axially from a complementary shaped aperture therein, the outer end of said strap having an aperture registering with the bore of said nut, said nut having flanges extending therefrom of less axial depth than said nut and engaging said strap on the radially inner surface thereof, portions of said nut being peened over to engage the radially outer surface of said strap and secure said nut thereto, and screw means extending through said aperture in said outer strap end and engaging said nut whereby the end of said screw means can extend through said nut and be forced against an article received in said strap to aid in drawing said looped strap tightly thereagainst.

2. A clamp as in claim 1 wherein said aperture in said outer strap end has a reenforcing flange extending therearound, said overlapped strap ends being on a leg of said strap loop to have said thumbscrew engage a leg of one of a pair of telescoped angles and draw the ends of the hypotenuse of said strap loop against the ends of the legs of the other of the pair of telescoped angles engaged by the clamp.

3. In combination, a pair of right angle shaped telescoped angles, and a clamp for and extending around said pair of telescoped angles, which clamp comprises a metal strap forming a right angle triangularly shaped loop having a substantially flat vertical leg and a flat horizontal leg and with overlapped inner and outer ends forming said vertical leg, said overlapped strap ends having apertures therein, nut means operatively carried by the inner end of said strap, said nut means being nonrotatably positioned in said strap, said loop having a hypotenuse extending across the open ends of said angles and with said horizontal and vertical legs extending parallel to corresponding legs of said angles to provide a fulcrum for contact with said angles adjacent each end of the hypotenuse of said loop and with the main load bearing fulcrum being at the end of said horizontal leg, reenforcing rib means on said metal strap at the substantially right angle corner therein and extending a distance on both the vertical and horizontal legs of said strap, and a screw means extending through the aperture in said outer strap end and engaging said nut means to extend therethrough and bear against the vertical leg of the outer angle within the loop formed by said strap, said screw means extending parallel with said horizontal leg of said strap and being movable towards said hypotenuse whereby said screw means can pull said strap tightly against said angles primarily by movement of said horizontal leg of said loop and three pressure points of engagement are provided between the clamp and articles received therein.

4. In combination, a pair of right angle shaped telescoped angles, and an unsymmetrical clamp for and extending around said pair of telescoped angles, which clamp comprises a metal strap forming a right angle triangularly shaped loop having a substantially flat vertical leg and a flat horizontal leg and with overlapped inner and outer ends forming said vertical leg, said overlapped strap ends having apertures therein and with a reenforcing flange being formed around the aperture in said outer strap end, nut means operatively carried by the inner end of said strap, said nut means being nonrotatably positioned in said strap, said loop having a hypotenuse extending across the open ends of said angles and with said horizontal and vertical legs extending parallel to corresponding legs of said angles to provide a fulcrum for contact with said angles adjacent each end of the hypotenuse of said loop and with the main load bearing fulcrum being at the end of said horizontal leg, reenforcing rib means on said metal strap at the substantially right angle corner therein and extending a distance on both the vertical and horizontal legs of said strap, said right angle corner usually being spaced from said pair of angles, and a screw means extending through the aperture in said outer strap end and engaging said nut means to extend therethrough and bear against the vertical leg of the outer angle within the loop formed by said strap, said screw means extending parallel with said horizontal leg of said strap and being movable towards said hypotenuse whereby said screw means can pull said strap tightly against said angles primarily by movement of said horizontal leg of said loop and three pressure points of engagement are provided between the clamp and articles received therein.

References Cited in the file of this patent

UNITED STATES PATENTS

| 1,887,551 | Goble | Nov. 15, 1932 |
| 2,509,284 | Allen | May 30, 1950 |
| 2,750,660 | Newcomb | June 19, 1956 |

FOREIGN PATENTS

| 16,601 | France | Dec. 24, 1912 |
| 813,533 | Germany | Sept. 13, 1951 |